United States Patent
DeLuca et al.

(10) Patent No.: US 10,217,019 B2
(45) Date of Patent: Feb. 26, 2019

(54) ASSOCIATING A COMMENT WITH AN OBJECT IN AN IMAGE

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US); Zachary M. Greenberger, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/397,819

(22) Filed: Jan. 4, 2017

(65) Prior Publication Data
US 2018/0189593 A1    Jul. 5, 2018

(51) Int. Cl.
| G06F 17/27 | (2006.01) |
| G06K 9/46 | (2006.01) |
| G06K 9/62 | (2006.01) |
| G06K 9/00 | (2006.01) |

(52) U.S. Cl.
CPC ....... *G06K 9/4604* (2013.01); *G06F 17/2785* (2013.01); *G06K 9/00664* (2013.01);
(Continued)

(58) Field of Classification Search
CPC ............................ G06K 9/4604; G06F 3/0482
See application file for complete search history.

(56) References Cited

U.S. PATENT DOCUMENTS

| 2010/0241968 A1 | 9/2010 | Tarara et al. |
| 2013/0021322 A1 | 1/2013 | Joo et al. |
(Continued)

FOREIGN PATENT DOCUMENTS

| WO | 2012174637 | 12/2012 |
| WO | 2012177229 | 12/2012 |
(Continued)

OTHER PUBLICATIONS

Kisilevich, Slava et al.; "Beautiful picture of an ugly place". Exploring photo collections using opinion and sentiment analysis of user comments; Proceedings of the International Multiconference on Computer Science and Information Technology; Oct. 18-20, 2010; pp. 419-428.
(Continued)

*Primary Examiner* — Siamak Harandi
(74) *Attorney, Agent, or Firm* — Schmeiser, Olsen & Watts; Brian Restauro

(57) ABSTRACT

An approach is provided for correlating a comment about an image with first object(s) in the image. Object(s) in the image are detected and identified. Based on a cognitive and contextual analysis of the comment, the first object(s) included in the identified object(s) are determined to be referred to by the comment. Responsive to determining that the first object(s) are referred to by the comment, the comment is linked with the first object(s). Alternately, based on a cognitive and contextual analysis of the comment about the image, the comment is determined to be referring to object(s). Responsive to determining that the comment refers to the object(s), the image is scanned and responsive to the image being scanned, the object(s) are identified in the image. Based on the comment referring to the object(s) and responsive to the object(s) being identified, the comment is linked with the identified object(s).

18 Claims, 3 Drawing Sheets

(52) U.S. Cl.
CPC ............ *G06K 9/46* (2013.01); *G06K 9/6263* (2013.01); *G06K 9/00677* (2013.01)

(56) References Cited

U.S. PATENT DOCUMENTS

| | | | |
|---|---|---|---|
| 2013/0317808 A1* | 11/2013 | Kruel | H04L 51/32 704/9 |
| 2015/0193426 A1 | 7/2015 | Liu | |
| 2016/0116554 A1 | 4/2016 | Sakellariou et al. | |

FOREIGN PATENT DOCUMENTS

| | | |
|---|---|---|
| WO | 2015073461 | 5/2015 |
| WO | 2016053643 | 4/2016 |

OTHER PUBLICATIONS

Keller, Joseph; Facebook Messenger adding facial recognition for easier photo sharing [Priv]; Retrieved from the Internet Jul. 26, 2016; URL: http://crackberry.com/facebook-messenger-adding-facial-recognition-easi . . . ; 22 pages.

Fingas, Jon; Google's latest object recognition tech can spot everything in your living room; Retrieved from the Internet Jul. 26, 2016; URL: https://www.engadget.com/2014/09/08/google-details-obect-recognition . . . ; 7 pages.

Kahn, Justin; Google engineers make major advancement in automatic object recognition; Sep. 8, 2014; Retrieved from the Internet Jul. 26, 2016; URL: http://www.techspot.com/news/57993-google-engineeers-make-major-ad . . . ; 6 pages.

* cited by examiner

ASSOCIATING A COMMENT WITH AN OBJECT IN AN IMAGE

BACKGROUND

The present invention relates to managing images, and more particularly with correlating a comment about an image with at least one object depicted in the image.

Social media has become an integral part of communication. Every day, millions of users post images with the intention of drawing interest from their followers or friends. Known techniques of managing images include a social media service using facial recognition software to scan a user's photo in the user's smartphone to identify friend(s) of the user who are in the photos and notify the user to share the photo with the identified friend(s) via the social media service. Other known techniques of image management include accurately locating and identifying objects in images by applying neural network-based automatic image recognition.

SUMMARY

In one embodiment, the present invention provides a method of correlating a comment about an image with at least one object in the image. The method includes a computer detecting and identifying one or more objects in the image. The method further includes the computer receiving the comment about the image. The method further includes the computer performing a cognitive and contextual analysis of the comment. The method further includes based on the cognitive and contextual analysis, the computer determining which first one or more objects included in the identified one or more objects are referred to by the comment. The method further includes in response to the step of determining which first one or more objects are referred to by the comment, the computer linking the comment with the first one or more objects.

In another embodiment, the present invention provides a computer program product including a computer-readable storage device and a computer-readable program code stored in the computer-readable storage device. The computer-readable program code includes instructions that are executed by a central processing unit (CPU) of a computer system to implement a method of correlating a comment about an image with at least one object in the image. The method includes a computer system detecting and identifying one or more objects in the image. The method further includes the computer system receiving the comment about the image. The method further includes the computer system performing a cognitive and contextual analysis of the comment. The method further includes based on the cognitive and contextual analysis, the computer system determining which first one or more objects included in the identified one or more objects are referred to by the comment. The method further includes in response to the step of determining which first one or more objects are referred to by the comment, the computer system linking the comment with the first one or more objects.

In another embodiment, the present invention provides a method of correlating a comment about an image with one or more objects in the image. The method includes a computer receiving the comment about the image. The method further includes the computer performing a cognitive and contextual analysis of the comment. The method further includes based on the cognitive and contextual analysis, the computer determining that the comment is referring to the one or more objects. The method further includes in response to the step of determining that the comment is referring to the one or more objects, the computer scanning the image. The method further includes in response to the step of scanning, the computer identifying the one or more objects in the image. The method further includes based on the comment referring to the one or more objects and in response to the step of identifying the one or more objects in the image, the computer linking the comment with the one or more objects.

Embodiments of the present invention provide a cognitive and contextual association of an image's comment with an object included in the image to improve a user's experience with interacting with the image and to determine user sentiment as a basis for targeted advertising.

DETAILED DESCRIPTION

Overview

Embodiments of the present invention integrate cognitive and contextual analyses of comments about images to correlate the comments with respective objects depicted in the images. Embodiments of the present invention may automatically detect object(s) in the image based on the content of a comment about the image and subsequently tag the detected object(s) or portion(s) of the detected object(s) to associate the comment with the object(s) or the portion(s) of the object(s). If the cognitive and contextual analysis of the comment determines that the comment is not related to any of the detected object(s) in the image, then prior comment(s) are reviewed under the cognitive and contextual analysis to determine whether the prior comment(s) refer to first object(s) included in the detected object(s), and in response, if the prior comment(s) refer to first object(s) included in the detected object(s), then the comment is determined to likely refer to the first object(s). The content of the comment may identify a type of an object and the detection of the object(s) may be based on a detection of object(s) of the identified type. If multiple objects of the same type are detected in the image, then embodiments of the present invention may determine confidence scores for the multiple objects and categorize the objects based on the scores. The cognitive and contextual-based association of an image's comment with an object included in the image may be used to customize a user's experience with viewing images or to determine a sentiment of a user, which may be used as a basis for advertising targeted to the user.

System for Correlating a Comment with at Least One Object in an Image

Figure 1:
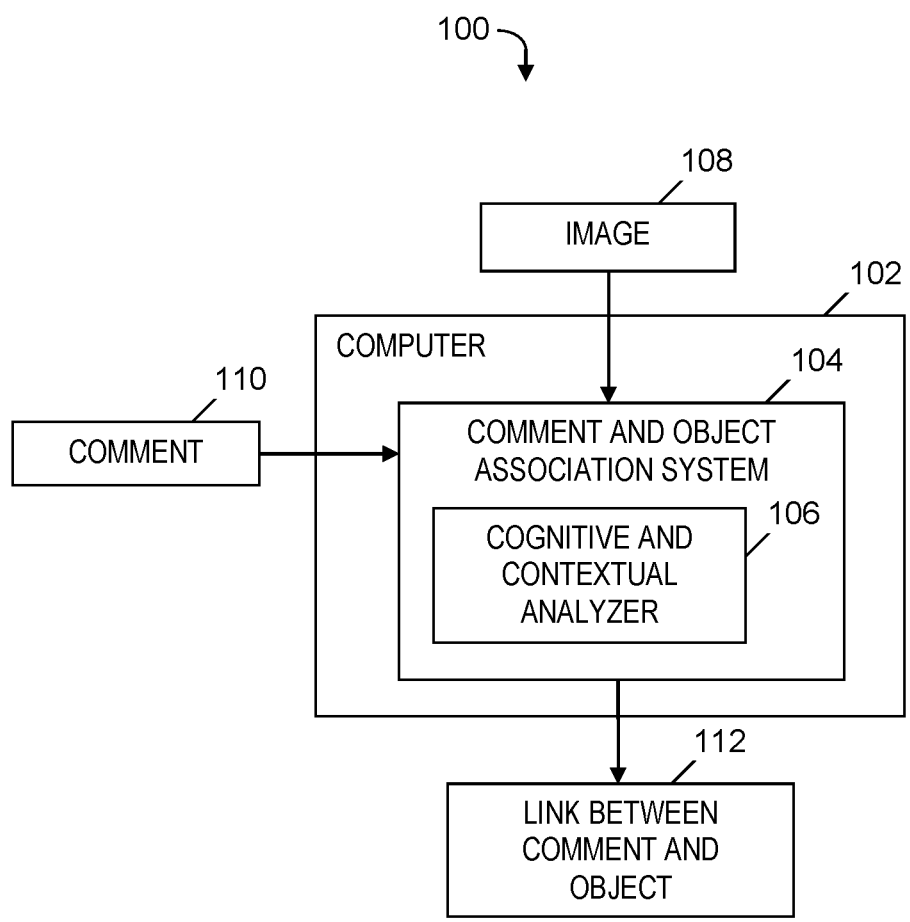
FIG. 1 is a block diagram of a system for correlating a comment about an image with at least one object in the image, in accordance with embodiments of the present invention.

FIG. 1 is a block diagram of a system 100 for correlating a comment about an image with at least one object in the image, in accordance with embodiments of the present invention. System 100 includes a computer 102 which executes a software-based comment and object association system 104, which includes a cognitive and contextual analyzer 106. Comment and object association system 104 receives an image 108 and a comment 110 about image 108. In one embodiment, image 108 depicts multiple objects. In another embodiment, image 108 depicts exactly one object. For example, image 108 may be a photo posted online via a social network website by a first user and comment 110 may be a message posted via the social network website by the first user or by a second user, where comment 110 includes content that refers to an object depicted in the photo.

Cognitive and contextual analyzer 106 performs a cognitive and contextual analysis of comment 110 to determine which object depicted in image 108 is referred to by the content of comment 110. Comment and object association system 104 generates a link 112 between comment 110 and the object depicted in image 108 that is referred to by the content of comment 110. As used herein, an object is defined as an identifiable portion of an image, where the portion is interpreted as a single unit. An object may be an inanimate thing (e.g., a structure, a vehicle, etc.), a person, an animal, or a portion of a thing, person, or animal.

Figure 2:
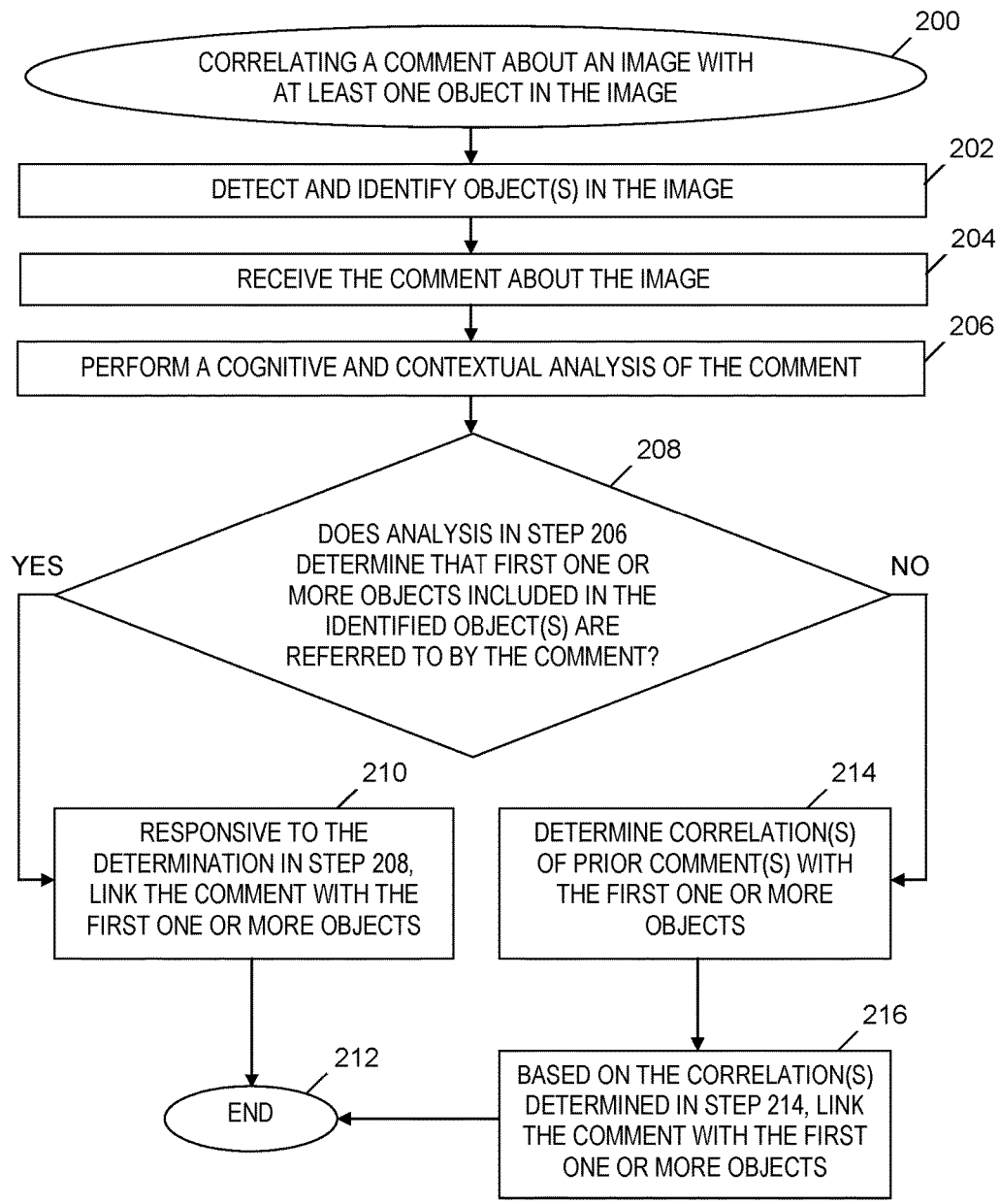
FIG. 2 is a flowchart of a process of correlating a comment about an image with at least one object in the image, where the process is implemented in the system of FIG. 1, in accordance with embodiments of the present invention.
Figure 3:
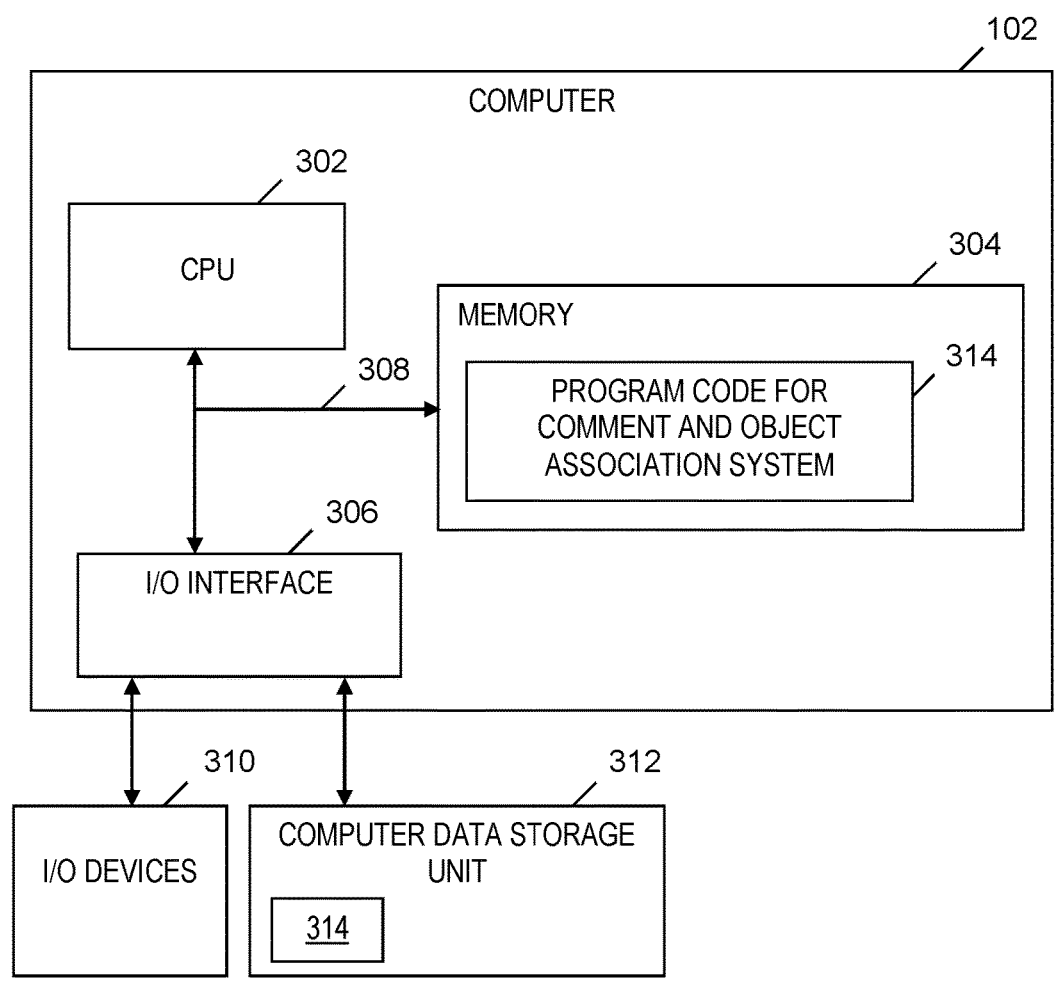
FIG. 3 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Correlating a Comment with at Least One Object in an Image

FIG. 2 is a flowchart of a process of correlating comment 110 (see FIG. 1) about image 108 (see FIG. 1) with at least one object in image 108 (see FIG. 1), where the process is implemented in the system of FIG. 1, in accordance with embodiments of the present invention. The process of FIG. 2 begins at step 200. In step 202, comment and object association system 104 (see FIG. 1) detects and identifies objects which are depicted in image 108 (see FIG. 1). In one embodiment, comment and object association system 104 (see FIG. 1) in step 202 detects and identifies the object(s) depicted in image 108 (see FIG. 1) by locating and reading tag(s) (i.e., metadata) on the object(s). In another embodiment, comment and object association system 104 (see FIG. 1) in step 202 uses an object recognition software tool which performs image analysis (i.e., object recognition) to identify the object(s) and if image 108 (see FIG. 1) depicts multiple objects, differentiate the objects from each other.

In step 204, comment and object association system 104 (see FIG. 1) receives comment 110 (see FIG. 1), which includes content that refers to image 108 (see FIG. 1). In one embodiment, the content included in comment 110 is textual, graphical, audio, or video information, or any combination of the aforementioned textual, graphical, audio, or video information.

In one embodiment, prior to step 202, a first user posts image 108 (see FIG. 1) (e.g., a photo) to a social media website and comment and object association system 104 (see FIG. 1) receives image 108 (see FIG. 1) from the social media website. Prior to step 204, a second user posts comment 110 (see FIG. 1) to the social media website. Step 204 includes comment and object association system 104 (see FIG. 1) receiving the posted comment 110 (see FIG. 1) from the social media website.

In step 206, cognitive and contextual analyzer 106 (see FIG. 1) performs a cognitive and contextual analysis of comment 110 (see FIG. 1). In one embodiment, cognitive and contextual analyzer 106 (see FIG. 1) in step 206 uses an expert system that employs natural language processing and machine learning which analyzes comment 110 (see FIG. 1).

In step 208, comment and object association system 104 (see FIG. 1) determines whether the analysis performed in step 206 determines that first object(s) included in the object(s) detected and identified in step 202 are referred to by the content of comment 110 (see FIG. 1). Hereinafter in the discussion of FIG. 2, the first object(s) determined in step 208 are referred to simply as "the first object(s)."

In one embodiment, comment and object association system 104 (see FIG. 1) in step 208 calculates confidence scores for respective objects detected and identified in step 202, where a confidence score is a measure of how likely comment 110 (see FIG. 1) is associated with the object corresponding to the confidence score (i.e., a measure of the likelihood that the content of comment 110 (see FIG. 1) refers to the object corresponding to the confidence score). The greatest confidence score included in the confidence scores indicates that the object corresponding to the greatest confidence score is likely the object in image 108 (see FIG. 1) that is referred to by the content of comment 110 (see FIG. 1). Factors affecting the confidence score of an object include whether the commenter has previously posted other comments referring to the object or to other object(s) whose type matches the type of the object, and whether the object is in the foreground or the background of image 108 (see FIG. 1).

In one or more embodiments, the determination in step 208 of an object included in the first object(s) includes comment and object association system 104 (see FIG. 1) determining one or more of the following: (i) a type (i.e., a class) of one or more objects referred to by comment 110 (see FIG. 1) (e.g., determining whether the comment is referring to a product, a place, a person, etc.); (ii) a sentiment of an author of comment 110 (see FIG. 1) (e.g., determining whether the author of the comment likes or dislikes the object); (iii) one or more other objects in image 108 (see FIG. 1) that are variant(s) of the object and attribute(s) of the object and attribute(s) of the variant(s) (e.g., determining how many variations of a dress are in the image and if there are more than one variations, determining attributes of a dress referred to in the comment and determining which one of the variations has the attributes); (iv) descriptive words in comment 110 (see FIG. 1) (e.g., determining that the comment includes the descriptive word "elegant" indicates that the comment more likely refers to a dress in the image rather than to a can of soda in the image); (v) information in comment 110 (see FIG. 1) that specifies one or more attributes of the object (e.g., determining the comment describes the color of the dress that Jane is wearing); (vi) a preference of the author of comment 110 (see FIG. 1) (e.g., determining the author of the comment loves shoes or determining that the image shows one of the author's favorite brands); (vii) a period of time between a posting of image 108 (see FIG. 1) to a social media website and a posting of comment 110 (see FIG. 1) to the social media website; (viii) the author of comment 110 (see FIG. 1) has posted one or more other comments that refer to the object (e.g., determining whether the author of the comment has seen the object before); and (ix) the author of comment 110 (see FIG. 1) is depicted in another image that includes the object (e.g., determining whether the author of the comment has the same kind of shoes).

If comment and object association system 104 (see FIG. 1) determines in step 208 that the analysis in step 206 determines that first object(s) included in the object(s)

identified in step 202 are referred to by comment 110 (see FIG. 1), then the Yes branch of step 208 is taken and step 210 is performed.

In step 210, responsive to the determination of the first object(s) in step 208, comment and object association system 104 (see FIG. 1) links (i.e., associates or correlates) comment 110 (see FIG. 1) with the first object(s). In one embodiment, computer 102 (see FIG. 1) or another computer (not shown) uses the association of comment 110 (see FIG. 1) with the first object(s) to target advertising of a product or service to a user, where the product or service is associated with the first object(s). After step 210, the process of FIG. 2 ends at step 212.

Returning to step 208, if comment and object association system 104 (see FIG. 1) determines in step 208 that the analysis in step 206 does not, or is not able to, determine that first object(s) included in the object(s) identified in step 202 are referred to by comment 110 (see FIG. 1), then the No branch of step 208 is taken and step 214 is performed.

In step 214, comment and object association system 104 (see FIG. 1) determines correlation(s) of prior comment(s) with first object(s) included in the object(s) identified in step 202. The prior comment(s) are comment(s) that were generated prior to comment 110 (see FIG. 1).

In step 216, based on the correlation(s) determined in step 214, comment and object association system 104 (see FIG. 1) links comment 110 (see FIG. 1) with the first object(s). After step 216, the process of FIG. 2 ends at step 212.

In one embodiment, comment and object association system 104 (see FIG. 1) links comment 110 (see FIG. 1) with the first object(s) in step 210 by using metadata or a meta tag.

In one embodiment, image 108 (see FIG. 1) is a photo posted on a social media website and comment and object association system 104 (see FIG. 1) receives the photo. Subsequent to step 210, comment and object association system 104 (see FIG. 1) detects a user interaction with a first object in the photo via a graphical user interface (e.g., hovering a mouse over the first object or clicking on the first object). Responsive to the detection of the user interaction with the first object, comment and object association system 104 (see FIG. 1) highlights comment 110 (see FIG. 1) and highlights any other comment(s) that are linked to the first object by previous performance(s) of the method of FIG. 2. The highlighting of the comment(s) may include comment and object association system 104 (see FIG. 1) (i) displaying text of the linked comment(s) using boldface type or another form of typographic emphasis or (ii) moving the linked comment(s) to a top of a list of comments about the posted photo (i.e., positioning the linked comment(s) to positions above other user comments that are linked to other objects and above unlinked user comments) and displaying the list of comments or a portion of the list of comments, where the portion includes the top of the list.

In an alternative embodiment, the process of FIG. 2 is modified so that the object(s) being referred to by comment 110 (see FIG. 1) are identified based on an analysis of comment 110 (see FIG. 1) prior to scanning image 108 (see FIG. 1) to recognize the object(s) among one or more objects in image 108 (see FIG. 1). In the alternative embodiment, comment and object association system 104 (see FIG. 1) (1) receives comment 110 (see FIG. 1) about image 108 (see FIG. 1); (2) performs the cognitive and contextual analysis of comment 110 (see FIG. 1); (3) based on the cognitive and contextual analysis, determines that comment 110 (see FIG. 1) is referring to the object(s); (4) in response to step (3), scans image 108 (see FIG. 1) and in response to the scan, identifies the object(s) among the one or more objects in image 108 (see FIG. 1); and (5) based on comment 110 (see FIG. 1) referring to the object(s) and in response to step (4), links comment 110 (see FIG. 1) with the object(s).

As compared to the aforementioned alternative embodiment which processes image 108 (see FIG. 1) multiple times for each comment posted about the image, the process of FIG. 2 advantageously performs image processing only once even though multiple comments may be posted for image 108 (see FIG. 1), thereby requiring less computer processing and less computing power. The aforementioned alternative embodiment may advantageously allow for more fine-grained results because a learning system may be employed to identify all previously posted comments and use the results of the learning system to determine the object(s) that are in image 108 (see FIG. 1).

Example

As an example of the process of FIG. 2, a first user authors and posts comment 110 (see FIG. 1) to a photo that was posted on a social media website. The content of comment 110 (see FIG. 1) is "I love her dress." Comment and object association system 104 (see FIG. 1) receives the "I love her dress" comment in step 204. Comment and object association system 104 (see FIG. 1) performs the cognitive and contextual analysis of the "I love her dress" comment in step 206 to determine that the object to be identified by is likely a dress worn by, or otherwise associated with, a female. In step 208, comment and object association system 104 (see FIG. 1) scans the photo for a female and a dress to determine what object in the photo is likely being referred to by the "I love her dress" comment. Comment and object association system 104 (see FIG. 1) identifies a dress in the photo that is likely being referred to by the comment, which causes the Yes branch of step 208 to be taken, and in step 210 comment and object association system 104 (see FIG. 1) links the "I love her dress" comment to the identified dress in the photo by using metadata. An advertising system may determine identification information and other attributes about the dress and use the link between the first user's comment and the dress to generate an enhanced advertisement targeted to the first user to advertise the dress or a similar dress. Comment and object association system 104 (see FIG. 1) can use the link between the comment and the dress to suggest to the first user other photos that the user may like.

Continuing the example presented above in a subsequent usage of the process of FIG. 2, a second user authors and posts a second comment on the social media website subsequent to the first user's posting of comment 110 (see FIG. 1). The second comment is a comment about the same photo referenced by comment 110 (see FIG. 1). The content of the second comment is "Me too!" Comment and object association system 104 (see FIG. 1) receives the "Me too!" comment in a step 204. Comment and object association system 104 (see FIG. 1) performs the cognitive and contextual analysis of the "Me too!" comment in step 206 to determine that the analysis is not able to determine that object(s) in the object(s) identified in step 202 are referred to by the second comment, which causes the No branch of step 208 to be taken. In step 214, comment and object association system 104 (see FIG. 1) reviews the results of using the process of FIG. 2 on prior comments that were made in reference to the photo, including comment 110 (see FIG. 1), which was generated and posted prior to the second comment being posted. Based on the review, comment and object association system 104 (see FIG. 1) determines that there is a correlation between a prior comment (i.e., comment 110 in FIG. 1) and the identified dress (i.e., determines that the comment 110 (see FIG. 1) was linked to the dress in the aforementioned performance step 210 in this example). In step 216, based on the correlation determined in step 214, comment and object association system 104 (see FIG. 1) links the "Me too!" comment with the identified dress.

Computer System

FIG. 3 is a block diagram of a computer 102 that is included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for comment and object association system 104 (see FIG. 1) and cognitive and contextual analyzer 106 (see FIG. 1) to perform a method of correlating a comment about an image with an object in the image, where the instructions are executed by CPU 302 via memory 304. CPU 302 may include a single processing unit, or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display device, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer-readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to correlate a comment about an image with an object in the image. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

Storage unit 312 and/or one or more other computer data storage units (not shown) that are coupled to computer 102 may store image 108 (see FIG. 1) and comment 110 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to correlating a comment about an image with an object in the image. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to correlate a comment about an image with an object in the image. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of correlating a comment about an image with an object in the image.

While it is understood that program code 314 for correlating a comment about an image with an object in the image may be deployed by manually loading directly in client, server and proxy computers (not shown) via loading a computer-readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of correlating a comment about an image with an object in the image. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of correlating a comment about an image with at least one object in the image, the method comprising the steps of:
   a computer detecting and identifying one or more objects in the image;
   the computer receiving the comment about the image;
   the computer performing a cognitive and contextual analysis of the comment;
   based on the cognitive and contextual analysis, the computer determining which first one or more objects included in the identified one or more objects are referred to by the comment; and
   in response to the step of determining which first one or more objects are referred to by the comment, the computer linking the comment with the first one or more objects,
   wherein the step of determining which first one or more objects included in the identified one or more objects are referred to by the comment includes:
      calculating one or more confidence scores for the identified one or more objects, respectively, the one or more confidence scores being measures of how likely the comment refers to the respective identified one or more objects, and the one or more confidence scores including first one or more confidence scores for the first one or more objects, respectively; and
      determining that the first one or more confidence scores for the first one or more objects indicate that the comment referring to the first one or more objects is more likely than the comment referring to any other object included in the identified one or more objects.

2. The method of claim 1, wherein the step of performing the cognitive and contextual analysis includes using an expert system that employs natural language processing and machine learning which analyzes the comment.

3. The method of claim 1, wherein the steps of detecting and identifying the one or more objects includes either (i) locating and reading one or more tags on the one or more objects being identified or (ii) using an object recognition tool to identify the one or more objects and, if the image includes a plurality of objects, differentiate the objects from each other.

4. The method of claim 1, wherein the step of calculating the one or more confidence scores includes based on one or more factors, calculating a confidence score for a first object included in the first one or more objects, wherein each factor is selected from the group consisting of (i) whether an author of the comment has previously commented on the first object, (ii) whether the author of the comment has previously commented on one or more other objects whose type matches a type of the first object, and (iii) whether the first object is in a foreground or a background of the image.

5. The method of claim 1, wherein the step of determining which first one or more objects are referred to by the comment includes determining a first object included in the first one or more comments is referred to by the comment based on one or more determinations, wherein each determination is selected from the group consisting of (i) a determination of a type of an object referred to by the comment; (ii) a determination of a sentiment of an author of the comment; (iii) a determination of one or more other objects in the image that are variants of the first object; (iv) a determination of words in the comment that describe the first object; (v) a determination of information in the comment that specifies one or more attributes of the first object; (vi) a determination of a preference of the author of the comment; (vii) a determination of a period of time between a posting of the image to a social media website and a posting of the comment to the social media website; (viii) a determination that the author of the comment has posted one or more other comments that refer to the first object; and (ix) a determination that the author of the comment is depicted in another image that includes the first object.

6. The method of claim 1, further comprising the steps of:
   the computer receiving the image as a photo posted on a social media website;
   the computer detecting a user interaction via a graphical user interface with a first object included in the first one or more objects in the photo;
   in response to the step of detecting the user interaction, the computer highlighting one or more user comments linked to the first object in response to a determination that the one or more user comments refer to the first object, wherein the step of highlighting includes (i) displaying text of the one or more user comments using boldface or another form of typographic emphasis or (ii) moving the one or more user comments to a top of a list of user comments about the photo and displaying at least the top of the list of user comments.

7. The method of claim 1, further comprising the steps of:
   the computer receiving a second comment about the image;
   the computer performing the cognitive and contextual analysis of the second comment;
   based on the cognitive and contextual analysis of the second comment, the computer determining that the second comment is not related to any object included in the identified one or more objects in the image;
   the computer determining one or more correlations of one or more other comments with the first one or more objects included in the identified one or more objects in the image, the one or more other comments being made prior to the second comment; and
   based on the one or more correlations, the computer linking the second comment with the first one or more objects.

8. The method of claim 1, wherein the step of linking the comment with the first one or more objects includes associating the comment with the first one or more objects via metadata or one or more respective meta tags.

9. The method of claim 1, further comprising the step of:
   providing at least one support service for at least one of creating, integrating, hosting, maintaining, and deploying computer-readable program code in the computer, the program code being executed by a processor of the computer to implement the steps of detecting and identifying the one or more objects in the image, receiving the comment about the image, performing the cognitive and contextual analysis of the comment, determining which first one or more objects included in the identified one or more objects are referred to by the comment, and linking the comment with the first one or more objects.

10. A computer program product, comprising:
a computer-readable storage device; and
a computer-readable program code stored in the computer-readable storage device, the computer-readable program code containing instructions that are executed by a central processing unit (CPU) of a computer system to implement a method of correlating a comment about an image with at least one object in the image, the method comprising the steps of:
the computer system detecting and identifying one or more objects in the image;
the computer system receiving the comment about the image;
the computer system performing a cognitive and contextual analysis of the comment;
based on the cognitive and contextual analysis, the computer system determining which first one or more objects included in the identified one or more objects are referred to by the comment; and
in response to the step of determining which first one or more objects are referred to by the comment, the computer system linking the comment with the first one or more objects,
wherein the step of determining which first one or more objects included in the identified one or more objects are referred to by the comment includes:
calculating one or more confidence scores for the identified one or more objects, respectively, the one or more confidence scores being measures of how likely the comment refers to the respective identified one or more objects, and the one or more confidence scores including first one or more confidence scores for the first one or more objects, respectively; and
determining that the first one or more confidence scores for the first one or more objects indicate that the comment referring to the first one or more objects is more likely than the comment referring to any other object included in the identified one or more objects.

11. The computer program product of claim 10, wherein the step of performing the cognitive and contextual analysis includes using an expert system that employs natural language processing and machine learning which analyzes the comment.

12. The computer program product of claim 10, wherein the steps of detecting and identifying the one or more objects includes either (i) locating and reading one or more tags on the one or more objects being identified or (ii) using an object recognition tool to identify the one or more objects and, if the image includes a plurality of objects, differentiate the objects from each other.

13. The computer program product of claim 10, wherein the step of calculating the one or more confidence scores includes based on one or more factors, calculating a confidence score for a first object included in the first one or more objects, wherein each factor is selected from the group consisting of (i) whether an author of the comment has previously commented on the first object, (ii) whether the author of the comment has previously commented on one or more other objects whose type matches a type of the first object, and (iii) whether the first object is in a foreground or a background of the image.

14. The computer program product of claim 10, wherein the step of determining which first one or more objects are referred to by the comment includes determining a first object included in the first one or more objects is referred to by the comment based on one or more determinations, wherein each determination is selected from the group consisting of (i) a determination of a type of an object referred to by the comment; (ii) a determination of a sentiment of an author of the comment; (iii) a determination of one or more other objects in the image that are variants of the first object; (iv) a determination of words in the comment that describe the first object; (v) a determination of information in the comment that specifies one or more attributes of the first object; (vi) a determination of a preference of the author of the comment; (vii) a determination of a period of time between a posting of the image to a social media website and a posting of the comment to the social media website; (viii) a determination that the author of the comment has posted one or more other comments that refer to the first object; and (ix) a determination that the author of the comment is depicted in another image that includes the first object.

15. The computer program product of claim 10, wherein the method further comprises the steps of:
the computer system receiving the image as a photo posted on a social media website;
the computer system detecting a user interaction via a graphical user interface with a first object included in the first one or more objects in the photo;
in response to the step of detecting the user interaction, the computer system highlighting one or more user comments linked to the first object in response to a determination that the one or more user comments refer to the first object, wherein the step of highlighting includes (i) displaying text of the one or more user comments using boldface or another form of typographic emphasis or (ii) moving the one or more user comments to a top of a list of user comments about the photo and displaying at least the top of the list of user comments.

16. The method of claim 10, further comprising the steps of:
the computer system receiving a second comment about the image;
the computer system performing the cognitive and contextual analysis of the second comment;
based on the cognitive and contextual analysis of the second comment, the computer system determining that the second comment is not related to any object included in the identified one or more objects in the image;
the computer system determining one or more correlations of one or more other comments with the first one or more objects included in the identified one or more objects in the image, the one or more other comments being made prior to the second comment; and
based on the one or more correlations, the computer system linking the second comment with the first one or more objects.

17. The computer program product of claim 10, wherein the step of linking the comment with the first one or more objects includes associating the comment with the first one or more objects via metadata or one or more respective meta tags.

18. A method of correlating a comment about an image having one or more objects in the image, the method comprising the steps of:

a computer receiving the comment about the image;
the computer performing a cognitive and contextual analysis of the comment;
based on the cognitive and contextual analysis, the computer determining that the comment is referring to the one or more objects;
in response to the step of determining that the comment is referring to the one or more objects, the computer scanning the image and in response to the step of scanning, the computer identifying the one or more objects in the image; and
based on the comment referring to the one or more objects and in response to the step of identifying the one or more objects in the image, the computer linking the comment with the one or more objects.

* * * * *